US009963229B2

(12) United States Patent
Welker et al.

(10) Patent No.: US 9,963,229 B2
(45) Date of Patent: May 8, 2018

(54) STRUCTURE AND MANUFACTURING PROCESS FOR UNMANNED AERIAL VEHICLE

(71) Applicant: Identified Technologies Corporation, Pittsburgh, PA (US)

(72) Inventors: Bennett Logan Montooth Welker, Homestead, PA (US); Richard Yang Zhang, Pittsburgh, PA (US); Anna Wu Yang, Lexington, MA (US); Andy Wu, Lexington, MA (US)

(73) Assignee: IDENTIFIED TECHNOLOGIES CORPORATION, Pittsburgh, PA (US)

( * ) Notice: Subject to any disclaimer, the term of this patent is extended or adjusted under 35 U.S.C. 154(b) by 217 days.

(21) Appl. No.: 14/924,866

(22) Filed: Oct. 28, 2015

(65) Prior Publication Data
US 2016/0122017 A1 May 5, 2016

Related U.S. Application Data

(60) Provisional application No. 62/069,977, filed on Oct. 29, 2014.

(51) Int. Cl.
*B64C 27/08* (2006.01)
*B64C 39/02* (2006.01)
*B64C 1/00* (2006.01)

(52) U.S. Cl.
CPC .... *B64C 39/024* (2013.01); *B64C 2001/0072* (2013.01); *B64C 2201/027* (2013.01); *B64C 2201/042* (2013.01); *B64C 2201/108* (2013.01)

(58) Field of Classification Search
CPC ........ B64C 2201/024; B64C 2201/027; B64C 2201/108; A63H 27/12
See application file for complete search history.

(56) References Cited

U.S. PATENT DOCUMENTS 3,930,332 A * 1/1976 Seefluth ................ A63H 27/12
244/17.11
5,310,134 A 5/1994 Hsu et al.
(Continued)

FOREIGN PATENT DOCUMENTS

DE 202013101170 U1 * 3/2013 ............. A63H 27/12
EP 2241896 A1 10/2010
(Continued)

OTHER PUBLICATIONS

Lucomposites, "UAV Wing Build Time Lapse", screenshots of youtube video uploaded Sep. 5, 2012, Lehigh University Composites Lab, retrieved on Dec. 28, 2015, retrieved from internet: https://www.youtube.com/watch?v=TMqKifRZGm4.
(Continued)

*Primary Examiner* — Joseph W Sanderson
(74) *Attorney, Agent, or Firm* — Coats & Bennett, PLLC

(57) ABSTRACT

An unmanned aerial vehicle (UAV) device and the manufacturing process to make the UAV. The UAV device comprises a monocoque shell with a single-piece molded construction that includes a central body and arms that extend outward from the central body. Each of the arms includes a terminal end that is spaced away from the central body. The monocoque shell has a cupped shape with a closed first side and an open second side that includes sidewalls that extend around an interior space. The UAV device comprises a plurality of motors and rotors attached to the first side of the monocoque shell with one of said plurality of motors and rotors positioned at the terminal end of each of the arms.

5 Claims, 15 Drawing Sheets

(56) References Cited

U.S. PATENT DOCUMENTS

| | | | |
|---|---|---|---|
| 5,406,458 A | 4/1995 | Schütt | |
| 5,722,618 A | 3/1998 | Jacobs et al. | |
| 6,119,976 A | 9/2000 | Rogers | |
| 6,739,556 B1 | 5/2004 | Langston | |
| 7,211,980 B1 | 5/2007 | Bruemmer et al. | |
| 7,400,950 B2 | 7/2008 | Reich | |
| 7,873,444 B1 | 1/2011 | Ehrmantraut et al. | |
| 8,511,606 B1 | 8/2013 | Lutke et al. | |
| 8,973,861 B2 * | 3/2015 | Zhou | A63H 27/12 244/17.23 |
| 9,004,973 B2 * | 4/2015 | Condon | A63H 13/00 446/37 |
| 9,061,763 B1 | 6/2015 | Christensen et al. | |
| 9,104,201 B1 | 8/2015 | Pillai et al. | |
| 9,567,076 B2 * | 2/2017 | Zhang | B64C 1/00 |
| 2003/0075642 A1 | 4/2003 | Silansky et al. | |
| 2004/0143602 A1 | 7/2004 | Ruiz et al. | |
| 2005/0051667 A1 | 3/2005 | Arlton et al. | |
| 2006/0222837 A1 * | 10/2006 | Kismarton | B29C 70/083 428/297.4 |
| 2007/0200027 A1 | 8/2007 | Johnson | |
| 2007/0222665 A1 | 9/2007 | Koeneman | |
| 2007/0284474 A1 | 12/2007 | Olson et al. | |
| 2008/0009969 A1 | 1/2008 | Bruemmer et al. | |
| 2008/0009970 A1 | 1/2008 | Bruemmer | |
| 2008/0077284 A1 | 3/2008 | Swope | |
| 2008/0276821 A1 | 11/2008 | Stancil | |
| 2009/0087029 A1 | 4/2009 | Coleman et al. | |
| 2010/0066587 A1 | 3/2010 | Yamauchi et al. | |
| 2011/0011323 A1 | 1/2011 | Wiggins et al. | |
| 2011/0143768 A1 | 6/2011 | Lane et al. | |
| 2011/0168838 A1 | 7/2011 | Hornback et al. | |
| 2012/0037059 A1 | 2/2012 | Brenner | |
| 2012/0043411 A1 | 2/2012 | Beck et al. | |
| 2012/0044710 A1 | 2/2012 | Jones | |
| 2012/0056041 A1 | 3/2012 | Rhee et al. | |
| 2012/0083945 A1 | 4/2012 | Oakley et al. | |
| 2012/0176239 A1 | 7/2012 | Preden et al. | |
| 2012/0191269 A1 | 7/2012 | Chen et al. | |
| 2013/0070677 A1 | 3/2013 | Chang | |
| 2013/0081245 A1 | 4/2013 | Vavrina et al. | |
| 2013/0163619 A1 | 6/2013 | Stephanson | |
| 2014/0032034 A1 | 1/2014 | Raptopoulos et al. | |
| 2014/0034775 A1 | 2/2014 | Hutson | |
| 2014/0034776 A1 | 2/2014 | Hutson | |
| 2014/0061376 A1 | 3/2014 | Fisher et al. | |
| 2014/0076642 A1 | 3/2014 | Gettings et al. | |
| 2014/0098990 A1 | 4/2014 | Vian et al. | |
| 2014/0099853 A1 | 4/2014 | Condon et al. | |
| 2014/0117147 A1 | 5/2014 | Hanna et al. | |
| 2014/0117149 A1 | 5/2014 | Zhou et al. | |
| 2014/0129059 A1 | 5/2014 | Scarlatti et al. | |
| 2014/0172194 A1 | 6/2014 | Levien et al. | |
| 2014/0203140 A1 | 7/2014 | McGeer et al. | |
| 2014/0231582 A1 | 8/2014 | Headrick | |
| 2015/0170524 A1 | 6/2015 | Stefani et al. | |
| 2015/0204973 A1 | 7/2015 | Nohara et al. | |
| 2015/0225049 A1 | 8/2015 | Fairfield et al. | |
| 2015/0336670 A1 * | 11/2015 | Zhang | B64C 1/00 244/119 |
| 2016/0130015 A1 | 5/2016 | Caubel et al. | |
| 2016/0362173 A1 | 12/2016 | Marion et al. | |

FOREIGN PATENT DOCUMENTS

| | | | |
|---|---|---|---|
| FR | 2995875 A1 * | 3/2014 | B64C 39/024 |
| GB | 2511754 A | 9/2014 | |

OTHER PUBLICATIONS

Elizabeth Kreft. "Guess Which Giant Retailer Has Officially Opened Up a 'Drone Store'". Retrieved from the Internet: URL: http://www.theblaze.com/stories/2014/09/08/guess-which-giant-retailer-has-officially-opened up a drone-store/ [retrieved on Oct. 22, 2015]; Sep. 8, 2014; pp. 1-4.

* cited by examiner

| | |
|---|---|
| 1201 | Generate computer-aided design model of monocoque |
| 1202 | Generate computer-aided design mold of monocoque |
| 1203 | Create the mold out of solid material |
| 1204 | Coat mold with materials |
| 1205 | Cut flat wrap patterns from sheet of fiber-reinforced plastic |
| 1206 | Layer individual flat wraps into mold |
| 1207 | Apply other materials |
| 1208 | Seal mold in vacuum container and vacuum out excess air |
| 1209 | Cure materials |
| 1210 | Remove excess material |
| 1211 | Perform any post-molding modifications to monocoque |
| 1212 | Attach other components of unmanned aerial vehicle |

Figure 12

STRUCTURE AND MANUFACTURING PROCESS FOR UNMANNED AERIAL VEHICLE

RELATED APPLICATIONS

This application claims the benefit of U.S. Provisional Patent Application No. 62/069,977 filed Oct. 29, 2014, the content of which is hereby incorporated herein by reference in its entirety.

TECHNICAL FIELD

This invention relates to the structure and manufacturing process of an unmanned aerial vehicle.

BACKGROUND

Unmanned aerial vehicles, also known as UAVs, are unmanned flying devices whose movements can be remotely controlled. Examples of unmanned aerial vehicles include tri-copters, quad-copters, multi-rotor flying crafts. An unmanned aerial vehicle is generally equipped with one or more motors. For example, T-Motor™ motors are excellent motors that are commercially available and can be used to build a multi-rotor craft. The motors drive one or more propellers and are powered by batteries or combustion engines. An unmanned aerial vehicle may be additionally equipped with a computer chip and may have antennas installed for communicating with a controlling device.

However, most of the commercially available UAVs are not suitable for business or military missions. The present application discloses both a UAV structure and advanced materials and manufacturing processes for building UAVs that are suitable for business or military missions and that are durable and capable of carrying a large payload.

SUMMARY

In accordance with the present invention, an unmanned aerial vehicle featuring a monocoque and the associated manufacturing process are disclosed. The unmanned aerial vehicle consists of a monocoque that houses some or all of the standard components for an unmanned aerial vehicle including but not limited to a flight computer, a system control, an energy source, and propulsion mechanism. An exemplary manufacturing process involving a mold and layered materials is also disclosed.

A monocoque is an external shell of an object that provides cover to internal components and support to the weight of the object and payloads. A monocoque design is suited for an unmanned aerial vehicle because it combines both the functionalities of a frame and an external housing. There are benefits to a single-piece streamlined design. For example, a single-piece streamlined design requires fewer seams. Fewer seams make the design waterproof and weatherproof. A single piece design is also more durable. A single-piece design may also be easier and less costly to manufacture. Some may also consider a single-piece design to be more aesthetically pleasing.

The monocoque may be constructed from many types of plastic, fiber-reinforced plastic, metal, wood, and other materials. Injection molding is a common manufacturing process for plastics and other materials. Fiber-reinforced plastic is a composite material constructed out of a fiber-reinforced polymer matrix. The fiber can consist of carbon, basalt, glass, aramid, and other fibers. Carbon fiber-reinforced plastic, commonly known as carbon fiber, is extremely strong and light and is an exemplary material to use in the monocoque. Carbon fiber has unique properties, causing its manufacturing process to differ from other polymers and composites.

The materials and chemicals described above for constructing a UAV are examples only. A person skilled in the art would understand that similar or equivalent materials or chemicals can be used to substitute for or used in conjunction with the materials and chemicals disclosed herein. The materials and chemicals described above for constructing UAVs have the benefit of reducing the weight of an unmanned aerial vehicle. In a UAV, reduced weight increases the agility of the vehicle by reducing the vehicle's inertia. Lighter weight also leads to greater flight times from a limited power supply, and reduces the cost of shipping when large quantities of unmanned aerial vehicles are to be transported.

One embodiment is directed to an unmanned aerial vehicle (UAV) device. The device includes a monocoque shell with a single-piece molded construction that includes a central body and arms that extend outward from the central body. Each of the arms includes a terminal end that is spaced away from the central body. The monocoque shell has a cupped shape with a closed first side and an open second side that includes sidewalls that extend around an interior space. Motors and rotors are attached to the first side of the monocoque shell with a motor and rotor positioned at the terminal end of each of the arms. A flight computer is positioned in the interior space of the central body. A baseplate extends across the interior space of the central body and seals the flight computer within the interior space of the central body.

The monocoque shell may include a first sheet integrated into the central body and each of the arms may include an integrated second sheet with the first sheet and the second sheets being separate and extending respectively through the closed first side and the sidewalls of the central body and the arms.

The device may also include an adhesive that connects the first sheet to the second sheets.

The device may also include at least one additional sheet in each of the central body and the arms.

The baseplate may be flat.

The motors may be positioned on the first side of the monocoque shell at the terminal end of the arms and wires may extend from the flight computer to each of the motors. Each of the wires may extend along the second side of one of arms between the sidewalls and through an opening in the first side of the monocoque shell adjacent to the terminal end.

The device may also include a battery attached to the bottom of the baseplate, with the battery configured to provide power to the motors and the flight computer.

The device may also include a loudspeaker within the interior space of the central body that is configured to emit audio to inform users of information.

Another embodiment is directed to an unmanned aerial vehicle (UAV) device. The device includes a monocoque shell with an integral single-piece construction that includes a central body and outwardly-extending arms that terminate away from the central body. The monocoque shell has a cupped shape with a base wall and sidewalls that extend from the base wall with an interior space formed by the base wall and the sidewalls. The central body includes a first sheet integrated into and extending along the base wall and the sidewalls of the central body. Each of the arms of the monocoque shell includes a second sheet integrated into and extending along the base wall and sidewalls of the arm. Motors and rotors are positioned on the monocoque shell with one of the motors and rotors attached to each of the arms. A flight computer is positioned in the interior space of the central body. A baseplate extends across the interior space of the central body and seals the flight computer within the interior space of the central body.

The device may also include a system controller positioned in the interior space of the central body and that is operatively connected to each of the motors.

The device may also include a flat interior plate that extends between the flight computer and the system controller.

The device may also include a battery attached to the baseplate and configured to power the flight computer and the motors. The battery may be attached to a first side of the baseplate opposite from the flight computer.

The device may also include an adhesive that connects the first sheet to the second sheets.

The device may also include at least one additional sheet in each of the central body and the arms.

The device may include wires that extend from the flight computer to each of the motors. Each of the wires may extend from the flight computer along the second side of the central body and one of arms between the sidewalls and through an opening in the arm to the motor.

Another embodiment is directed to an unmanned aerial vehicle (UAV) device. The device includes a monocoque shell with a single-piece molded construction that includes a central body and arms that extend outward from the central body. Each of the arms includes a terminal end that is spaced away from the central body. The monocoque shell has a cupped shape with a closed top side and sidewalls that extend around an interior space. The monocoque shell includes sheets integrated into and extending along the top side and the sidewalls of the central body and integrated into and extending along the top side and sidewalls of each of the arms. Motors and rotors are attached to the top side of the monocoque shell with one of the motors and rotors positioned at the terminal end of each of the arms. A flight computer is positioned in the interior space of the central body. A baseplate that extends across the interior space of the central body and seals the flight computer within the interior space of the central body.

BRIEF DESCRIPTION OF DRAWINGS

FIG. 12 lists an exemplary manufacturing process for a monocoque constructed of fiber-reinforced plastics.

DETAILED DESCRIPTION

Figure 1:
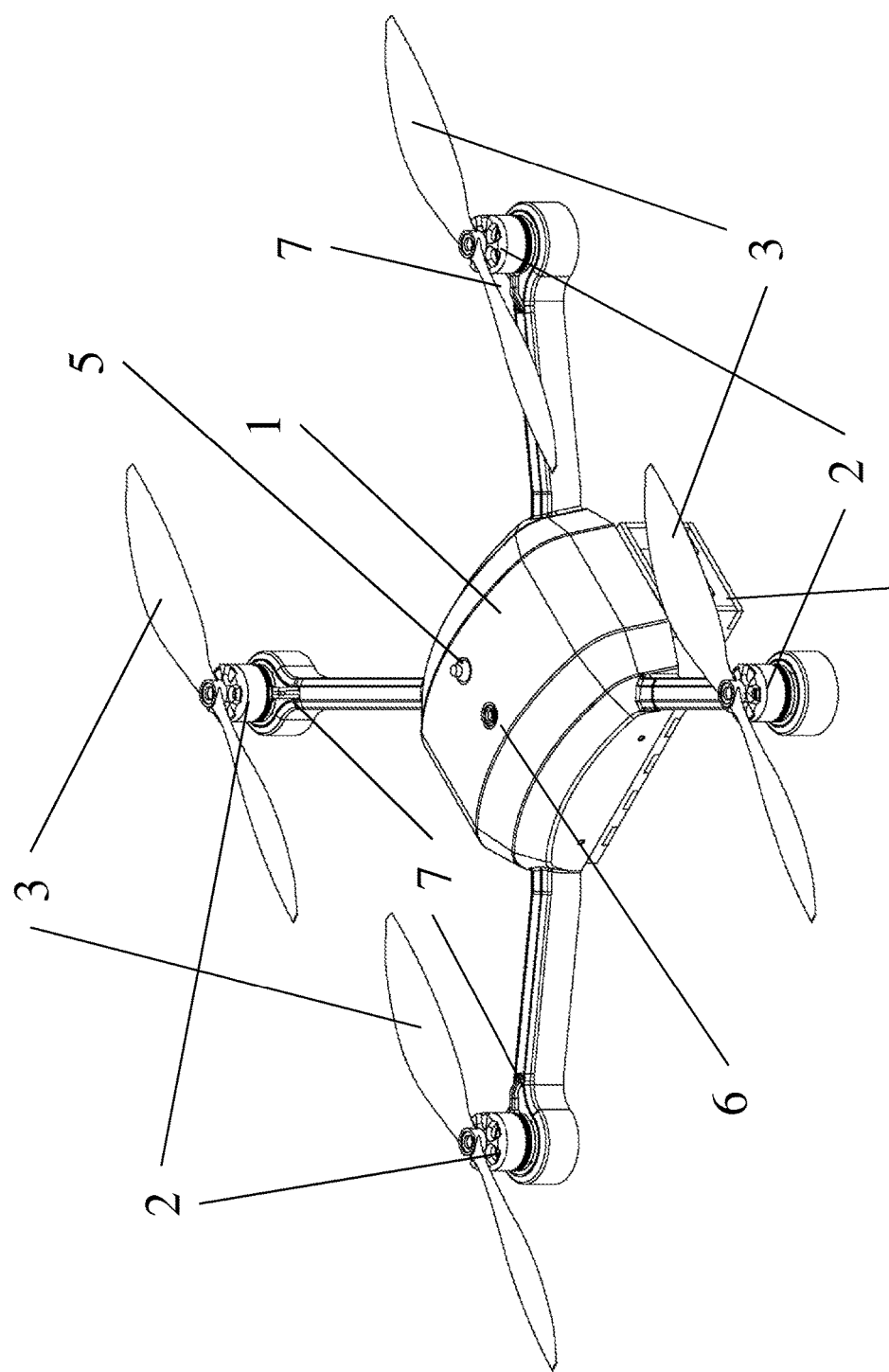
FIG. 1 illustrates an isometric projection of an assembled unmanned aerial vehicle.

FIG. 1 illustrates an isometric projection of an assembled unmanned aerial vehicle. The monocoque 1 acts both as the frame for the unmanned aerial vehicle and the housing for the internal components. The monocoque 1 has four arms and a central body. The monocoque can be made from a variety of materials, including carbon fiber-reinforced plastic, which has unique properties of strength and lightness. The motors 2 combined with the rotors 3 are the primary propulsion mechanism for the unmanned aerial vehicle depicted. Other propulsion mechanisms exist. Energy source 4 is mounted underneath the monocoque and provides the energy to the internal computers and propulsion mechanisms. In this diagram the energy source is depicted as a battery in a casing. Switch mechanism 5 allows a user to control the unmanned aerial vehicle by turning it on and off or perform a variety of other functions. Here the switch mechanism 5 is depicted as a button. Indicator light 6 expresses information about the state of the unmanned aerial vehicle, for example, whether or not the battery is charged or if the unmanned aerial vehicle is armed and about to take off. Wires 7 connect the motors 2 to the flight computer 9 (the flight computer is housed within the monocoque and is not depicted here).

A UAV constructed with a monocoque shell has several advantages over a UAV that is made of several different pieces. There are problems with having many separate pieces in an unmanned aerial vehicle. First, there are extra seams through which moisture and dust can leak through. Second, more parts may make the product less durable as there are more places for the parts to separate. Third, it may be costly to physically assemble many pieces together. Finally, it may be less aesthetically pleasing to have many pieces.

Figure 2:
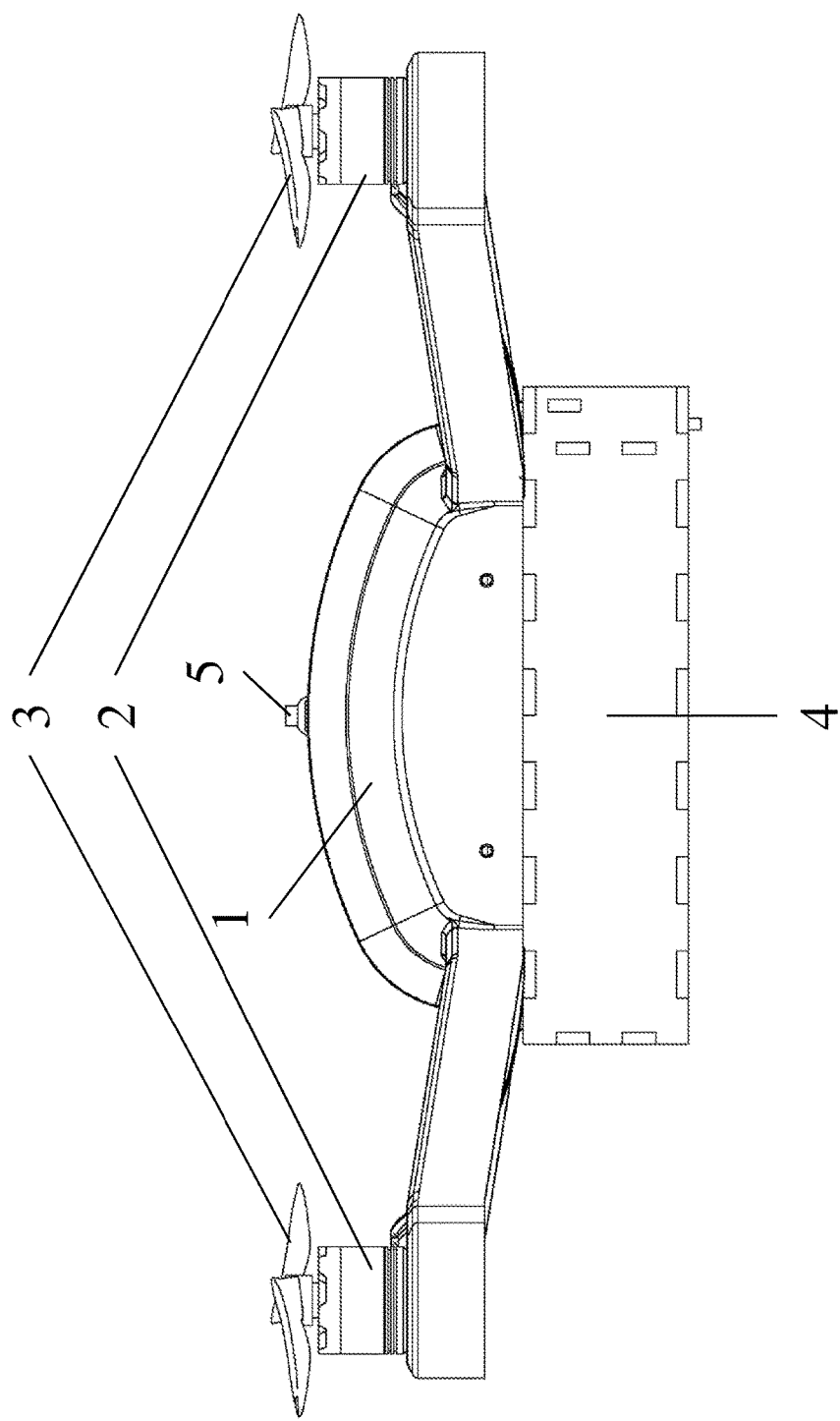
FIG. 2 illustrates a side view of an unmanned aerial vehicle.

FIG. 2 illustrates the side view of an unmanned aerial vehicle. This view also shows the monocoque 1, motors 2, rotors 3, energy source 4, and switch mechanism 5. Depicted on the side of monocoque 1 are two mounting holes, but those are optional and may be located in other places. The motors 2 are depicted sitting on the top of the ends of the arms of the monocoque, but other designs may have the motors housed inside the arms of the monocoque.

Figure 3:
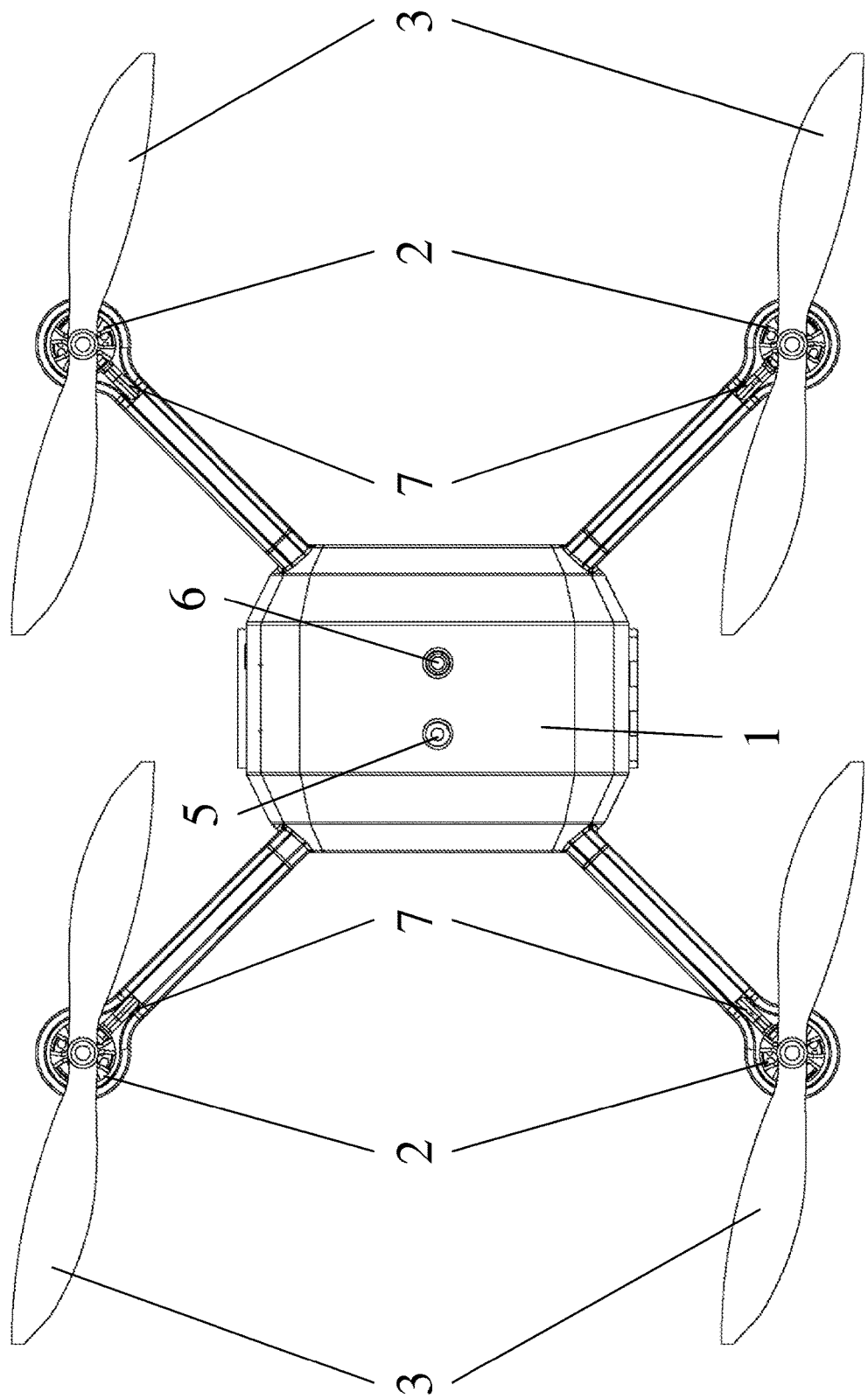
FIG. 3 illustrates a top view of an unmanned aerial vehicle.

FIG. 3 illustrates the top view of an unmanned aerial vehicle. This view also shows the monocoque 1, motors 2, rotors 3, switch mechanism 5, indicator light 6, and wires 7. In this top view we can see that there are various lines that depict bends in the shape of the monocoque depicted. These lines are aesthetic and optional.

Figure 4:
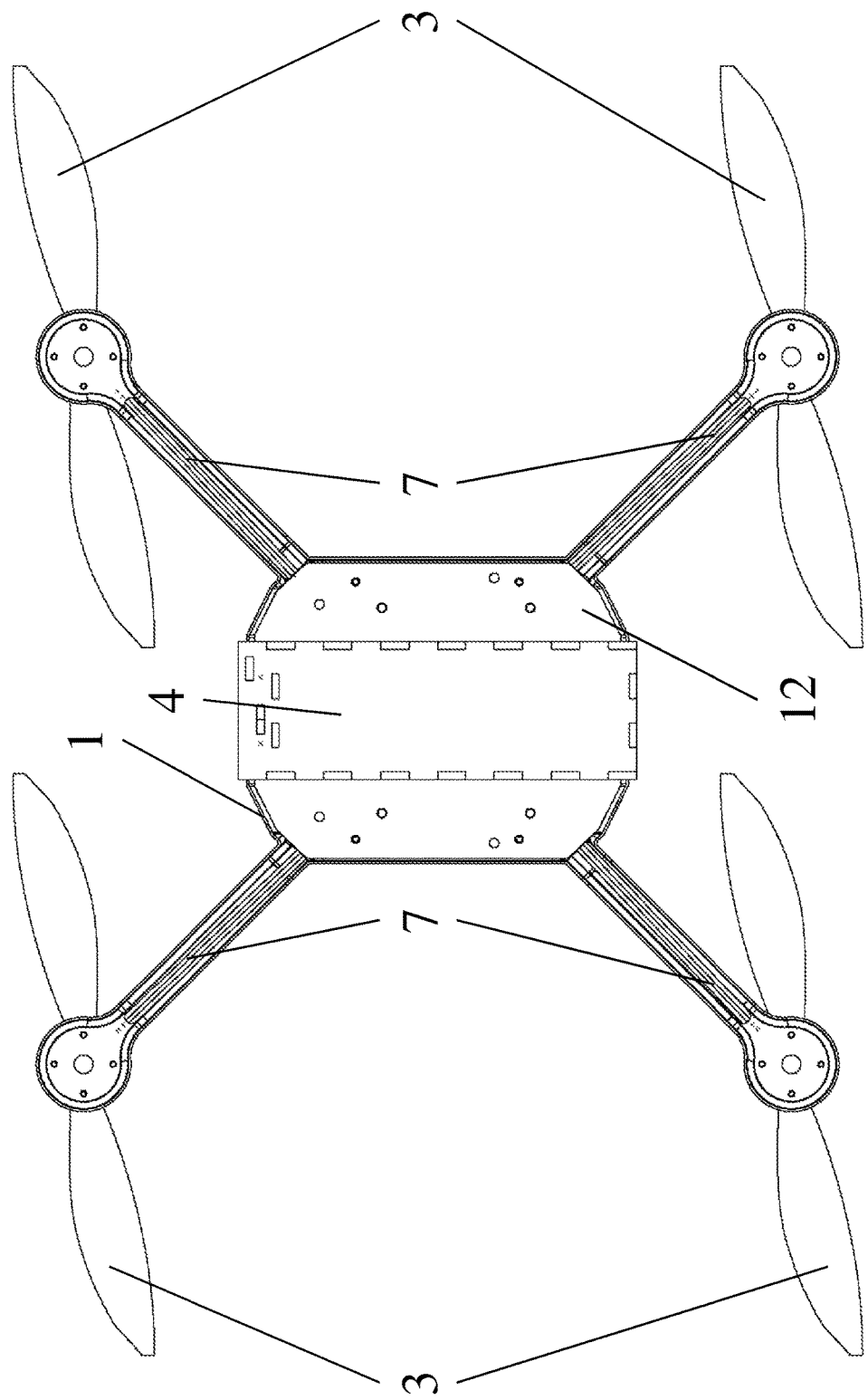
FIG. 4 illustrates a bottom view of an unmanned aerial vehicle.

FIG. 4 illustrates the bottom view of an unmanned aerial vehicle. This view also shows the monocoque 1, rotors 3, energy source 4, wires 7, and baseplate 12. The baseplate 12 has a number of mounting holes, which are optional and can be located in other places. Also depicted are the wires 7 that connect the motors 2 to the flight computer 9 (the motors 2 and the flight computer 9 are not shown). The wires 7 run underneath the arms of the monocoque 1. Baseplate 12 may be composed of sheet metal, because it is easy to manufacture and inexpensive relative to injection molding for small scale.

Figure 5:
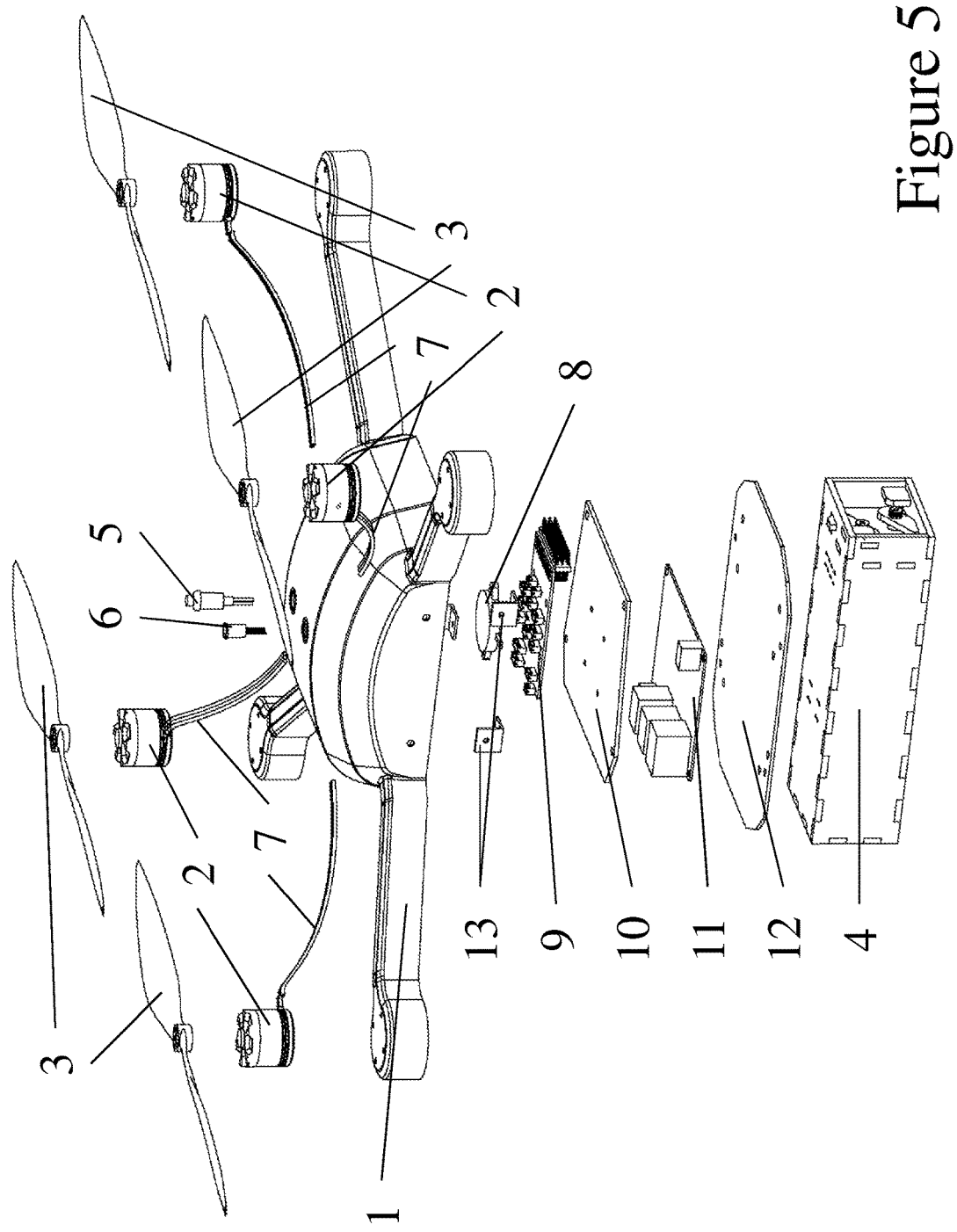
FIG. 5 illustrates an isometric projection of the components of an unmanned aerial vehicle.

FIG. 5 illustrates an isometric projection of the components of an unmanned aerial vehicle. The monocoque 1 houses the loudspeaker 8, flight computer 9, internal plate 10, and system control 11. The baseplate 12 seals off the bottom area of the center of the monocoque 1. The energy source 4 is attached to the bottom of the baseplate 12. The loudspeaker 8 emits noises to inform the user of information. The flight computer 9 is attached to the motors 2 via wires 7. The flight computer 9 controls the motors 2 and puts the unmanned aerial vehicle where it needs to be in space according to a pre-programmed flight path or a flight path transmitted to it remotely. A flight computer 9 typically contains an inertial measurement unit (IMU), gyroscope, GPS, and processing unit. A common flight control unit is the 3DR Pixhawk™ of 3DRobotics Inc. The internal plate 10 is included for structural stability and to separate the flight computer 9 from the system control 11, but in some embodiments it may be excluded. The system control 11 connects the flight computer 9 to optional peripherals (not depicted). A common system control 11 is the Odroid™, created by Hardkernel Co., Ltd. of South Korea. The baseplate 12 seals the bottom of the center area of the monocoque 1 and contains a number of mounting holes which are optional and may be located in other places. The mounting brackets 13 attach the baseplate 12 to the monocoque 1. The mounting brackets 13 use rivets or nuts and bolts to attach them to the baseplate 12 and the monocoque 1. The internal plate 10 and the baseplate 12 may be constructed out of a variety of materials but is usually constructed from the same material as the monocoque. Also depicted are the motors 2, the rotors 3, the switch mechanism 5, the light 6, and the wires 7.

Figure 6:
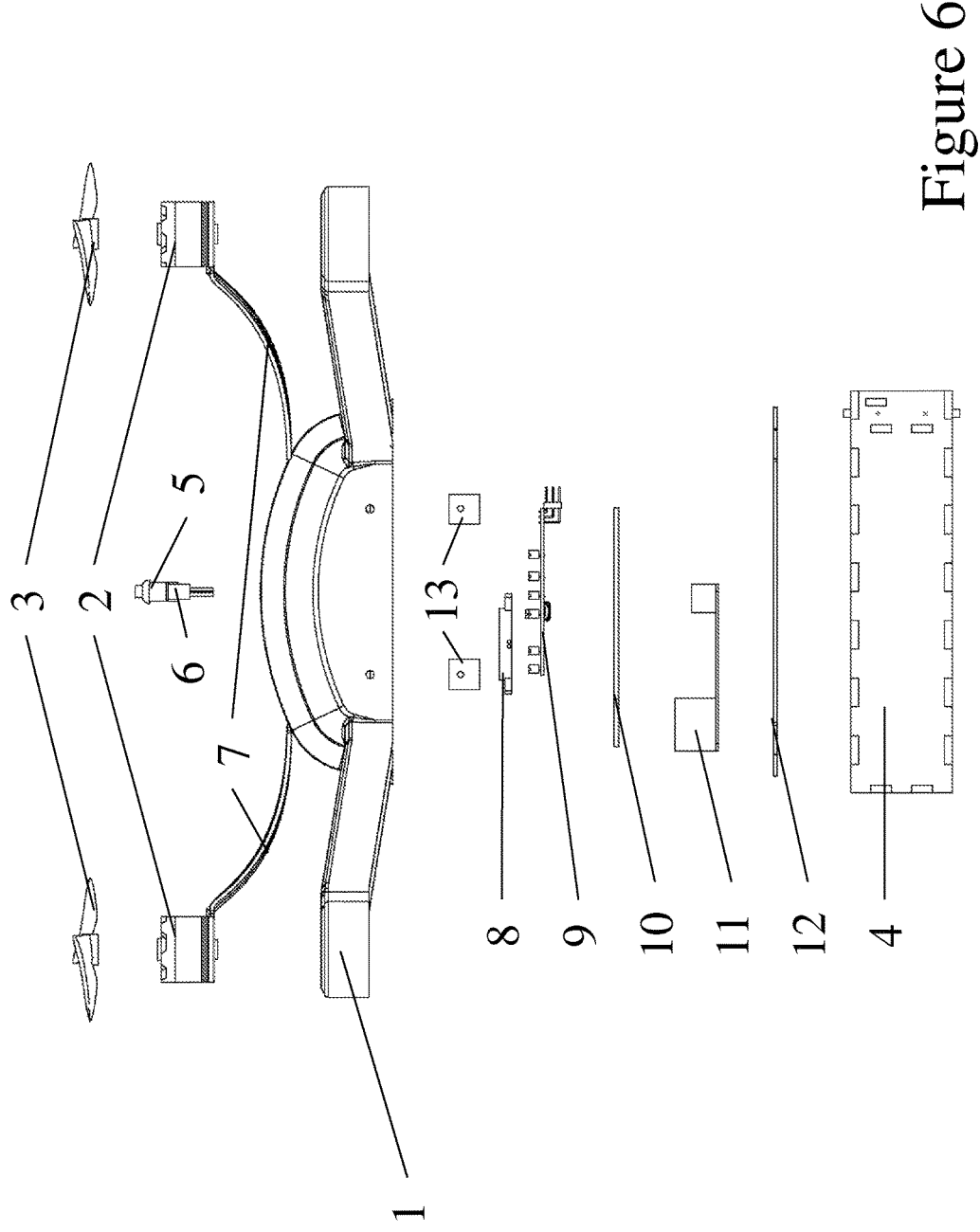
FIG. 6 illustrates a side view of the components of an unmanned aerial vehicle.

FIG. 6 illustrates a side view of the components of an unmanned aerial vehicle. This view also shows the rotors 3, the motors 2, the light 6, the wires 7, the monocoque 1, the mounting brackets 13, the loudspeaker 8, the flight computer 9, the internal plate 10, the system control 11, the baseplate 12, and the energy source 4.

Figure 7:
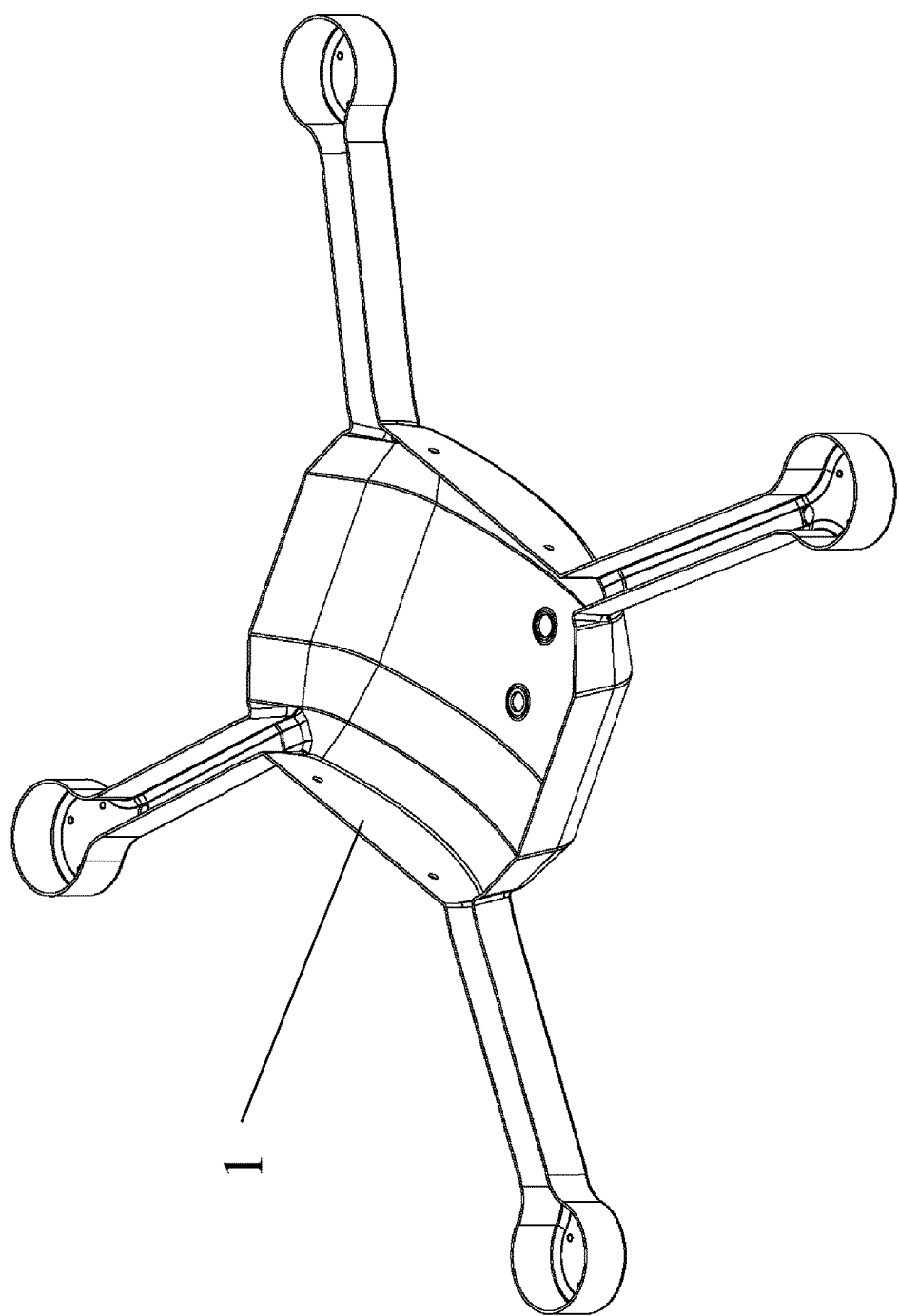
FIG. 7 illustrates an inside of the monocoque.

FIG. 7 illustrates the inside of the monocoque 1. This view is from the bottom. There are holes cut out for the switch mechanism 5 and the light 6.

Figure 8:
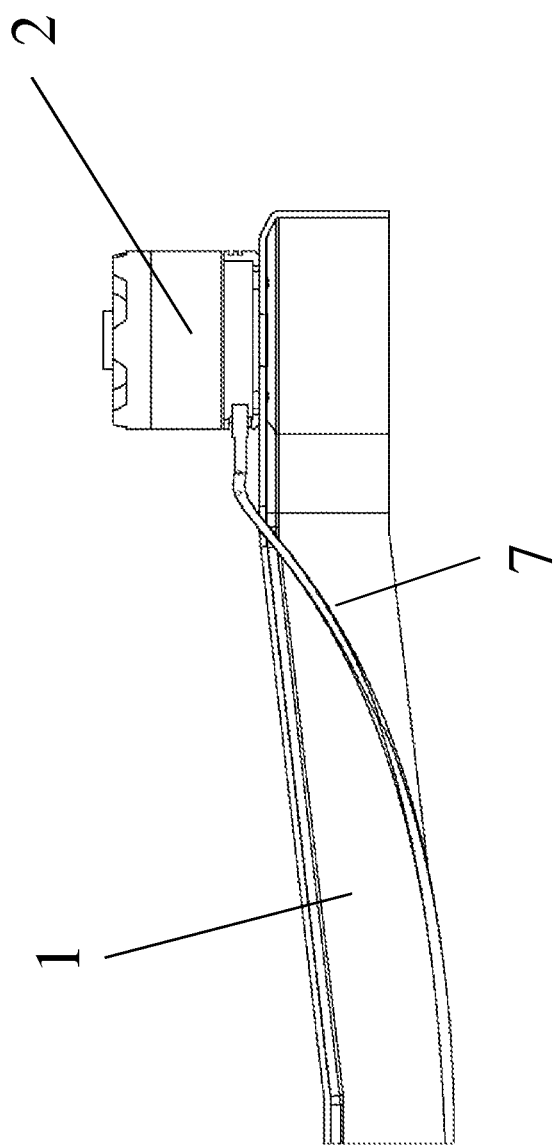
FIG. 8 illustrates exemplary wiring to the propulsion mechanism.

FIG. 8 illustrates exemplary wiring to the propulsion mechanism. This view also shows the cut-away view of a single arm of the monocoque 1. The motor 2 rests on top of the monocoque 1 arm and the wire 7 that attaches the motor 2 to the flight computer 9 runs from the motor 2 through the top surface of the monocoque 1 arm into the monocoque 1. The wire then runs through the arm to the flight computer 9, not depicted in this figure. The rotor 3 is not depicted.

Figure 9:
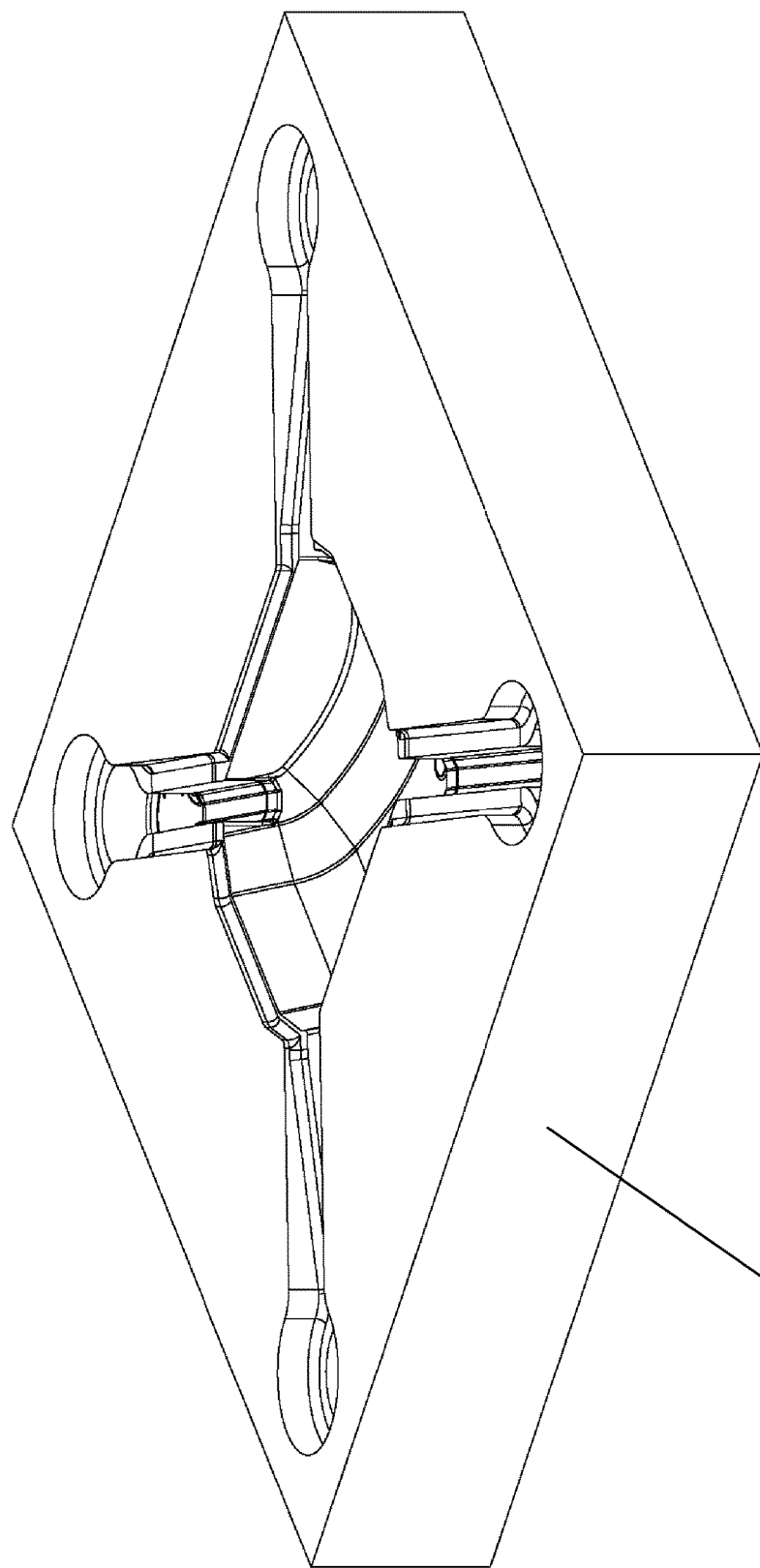
FIG. 9 illustrates a mold in an exemplary manufacturing process.

FIG. 9 illustrates the mold 14 in an exemplary manufacturing process. The mold 14 can be made out of foam, including high-density urethane (HDU) foam. The mold 14 may be created using a variety of methods, including a computer numerical controlled (CNC) mill. In the case that the monocoque 1 is to be manufactured out of fiber-reinforced plastic, the mold 14 may be coated with a gel coat and release coat as required and known to those skilled in the art. The shape of the monocoque 1 is formed by inserting the material into the mold 14.

Figure 10:
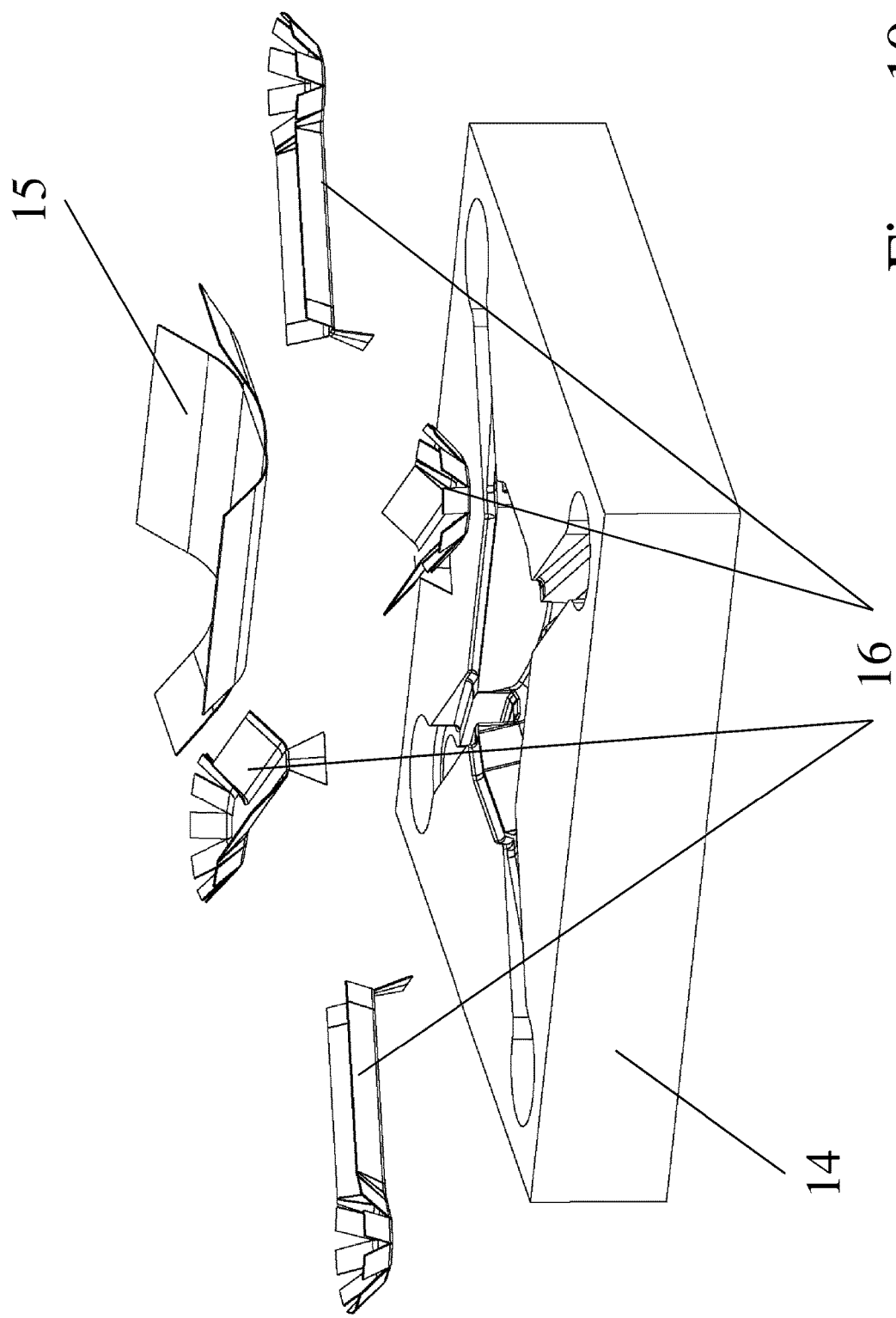
FIG. 10 illustrates an exemplary manufacturing process using the mold.

FIG. 10 illustrates an exemplary manufacturing process using the mold. The monocoque 1 is originally composed, in this case, of five pieces of which there are two different types, the body flat wrap 15 and the arm flat wraps 16. The manufacturing process depicted is for cases where the material of the monocoque does not need layering in the manufacturing, such as normal plastics. The flat wraps 15, 16 are inserted into the mold 14 and treated as needed to create the shape of the monocoque 1. Adhesive may be used to connect the arm flat wraps 16 to the body flat wrap 15.

Figure 11:
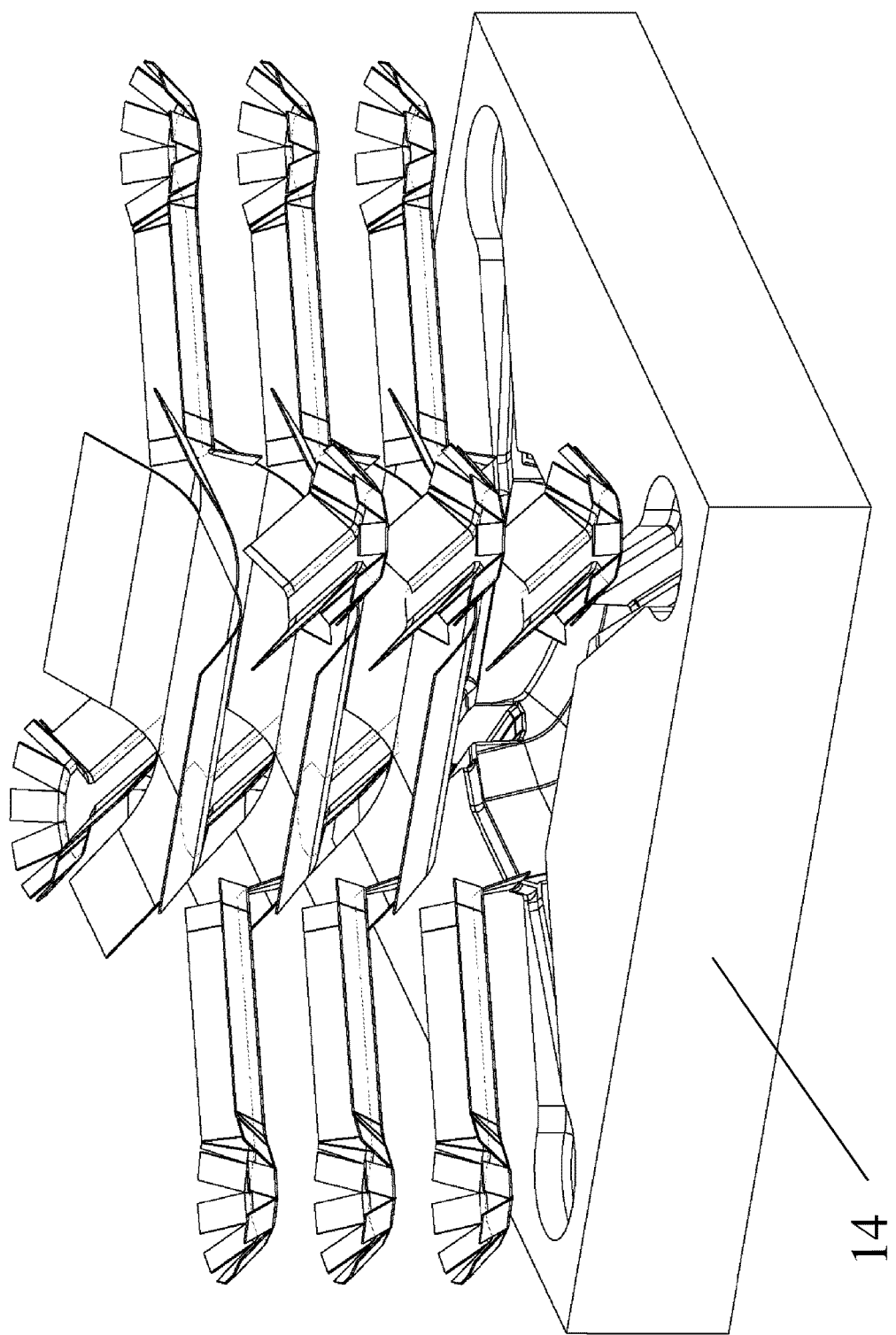
FIG. 11 illustrates an exemplary manufacturing process using multiple layers of materials and the mold.

FIG. 11 illustrates an exemplary manufacturing process using multiple layers of materials and the mold 14. Certain materials, such as fiber-reinforced plastics, require layering in the manufacturing process to increase the strength of the whole structure. In the method depicted, the flat wraps are inserted into the folder in the order depicted. The first set of arm flat wraps are inserted into the mold, then the first body flat wrap, then the second set of arm flat wraps, then the second body flat wrap, then the third set of arm flat wraps, then the third body flat wrap, and so on and so forth to create as many layers as desired. The specific material cut depicted has flaps that overlap between the arm flat wraps and the body flat wrap. The inserted flat wraps and the mold 14 are then cured and are connected to the flat wraps to form a single monocoque 1.

FIG. 12 lists the steps to an exemplary manufacturing process for a monocoque constructed of fiber-reinforced plastics. The steps listed should not be taken as required for the purposes of this invention; additional steps may be added and included steps may be excluded. We generate a computer-aided design (CAD) model of a monocoque 1 1201. We then use the CAD model of a monocoque to design the mold 14 for the monocoque 1202. The mold is then created out of a solid material 1203. This solid material may be high density urethane foam. This mold can be created through milling by a computer numerical control (CNC) mill. The mold may then be coated in other materials to enhance desired properties for better manufacturing 1204. For example, the mold may be coated in polyester gel coat to improve the surface finish and the ease of part removal from the mold in later steps. The mold may be coated in release agent to further improve the ease of part removal from the mold. We cut the flat wrap patterns 15 16 from a sheet of fiber-reinforced plastic, such as carbon fiber 1205. One may add as many flat wraps as needed in order to achieve as the desired thickness or strength of fiber-reinforced plastic in the final monocoque. These individual flat wraps are then layered into the mold. The arm flat wraps and the body flat wraps are alternately added 1206. For some materials, varying or synchronizing the orientation of the fibers in the fiber-reinforced plastic may offer additional strength benefits to the monocoque. For carbon fiber, arranging the layers such that the fibers run perpendicular to each other may be optimal. Additional materials such as release film and breather materials may be applied to the layers of fiber-reinforced plastic in the mold 1207. The mold and materials for the monocoque may now be sealed in a vacuum container, such as a vacuum bag, and excess air is vacuumed out 1208. The fiber-reinforced plastic may now be cured at the required temperature for a required amount of time 1209. After the curing process is finished, the mold and nearly completed monocoque can be removed from the vacuum, and we can cut off excess material such as loose fibers 1210. We can now make any other post-molding modifications to the monocoque, including drilling mounting holes and wire pass-through holes 1211. Finally, we can attach the other components of the unmanned aerial vehicle, as depicted in FIG. 5, such as the flight computer and baseplate.

Figure 13:
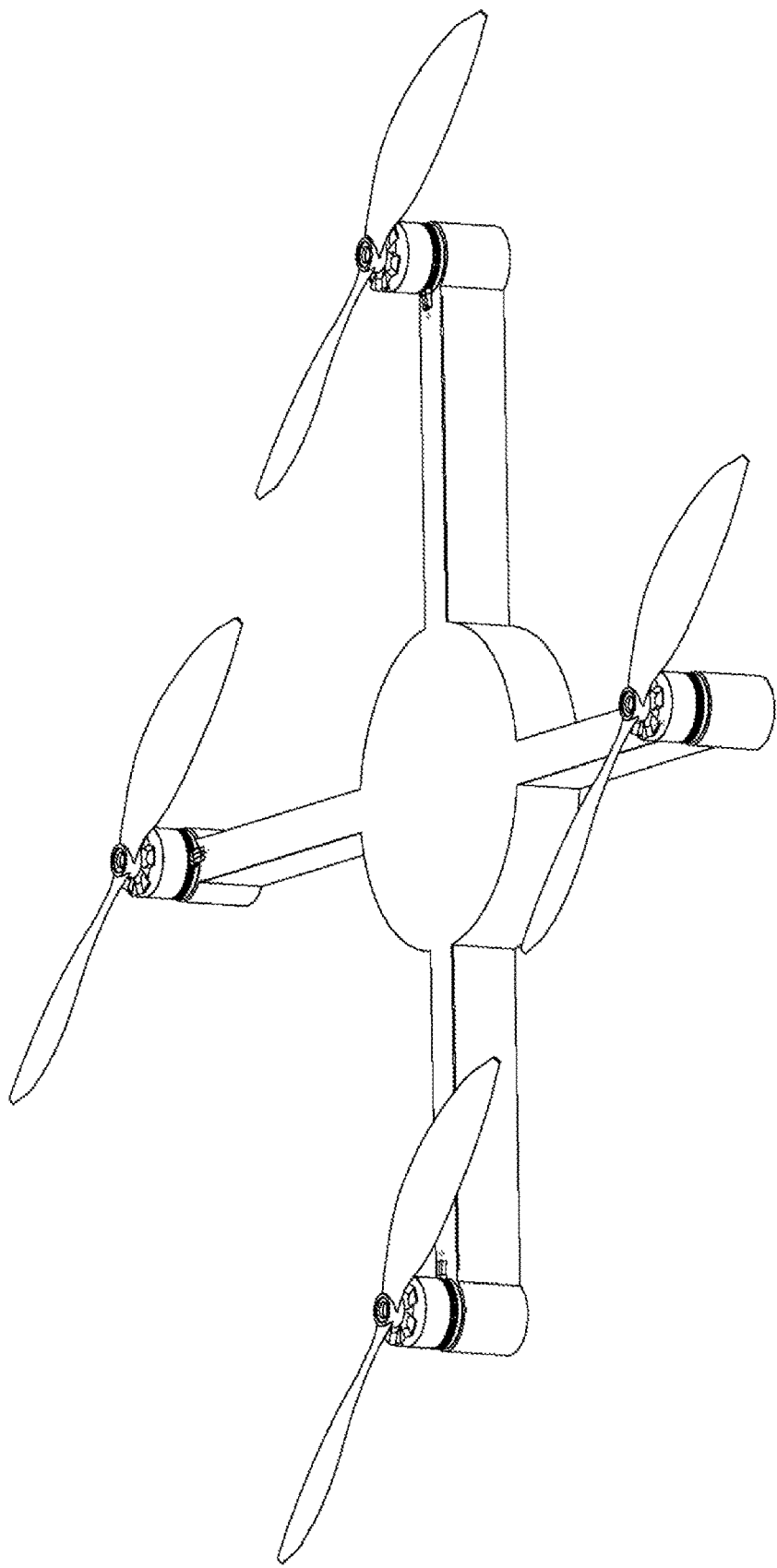
FIG. 13 illustrates an alternative design for an assembled unmanned aerial vehicle featuring a flat top monocoque.

FIG. 13 illustrates an alternative design for an assembled unmanned aerial vehicle featuring a flat top monocoque. The flat top monocoque can be manufactured in the same fashion as discussed in FIGS. 9 through 11. The mold must be shaped to account for the desired shape of the monocoque.

Figure 14:
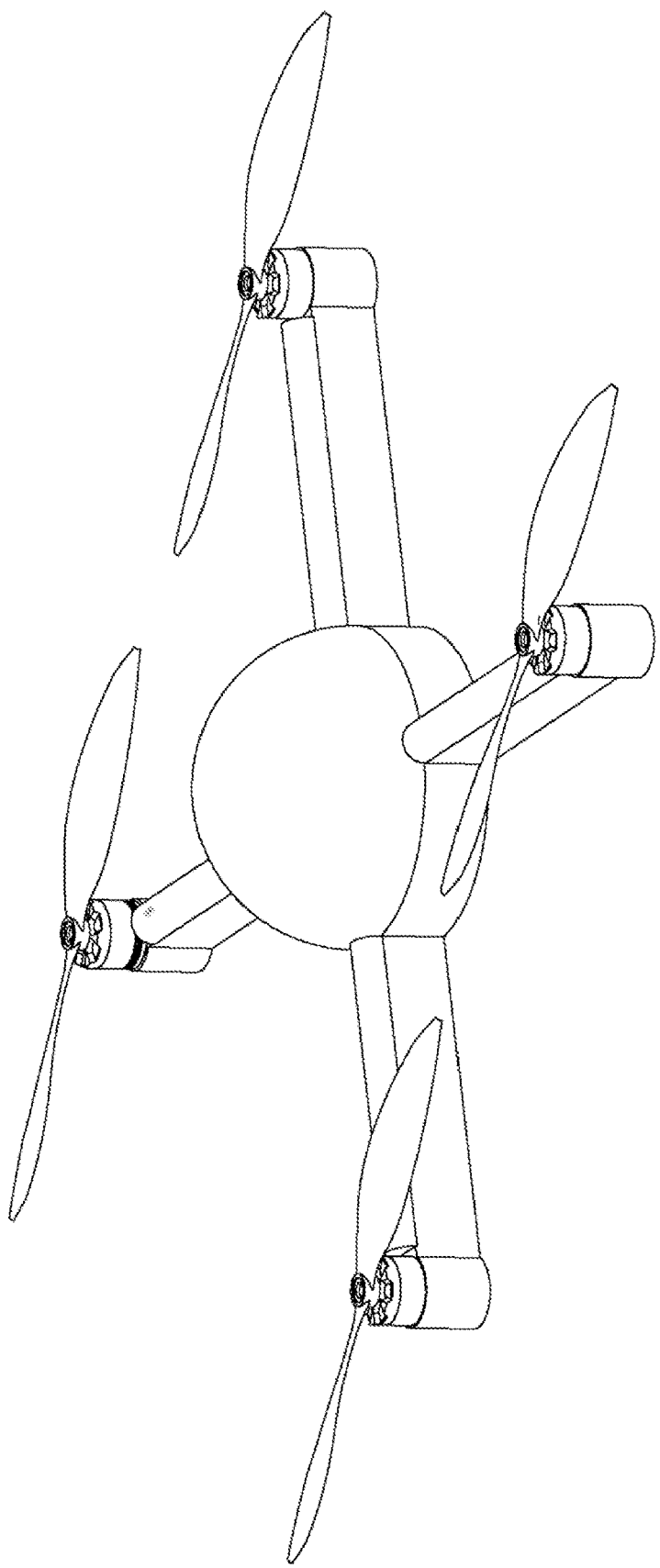
FIG. 14 illustrates an alternative design for an assembled unmanned aerial vehicle featuring a round top monocoque.

FIG. 14 illustrates an alternative design for an assembled unmanned aerial vehicle feature a round top monocoque. The top of the monocoque can be manufactured in the same fashion as discussed in FIGS. 9 through 11. The mold must be shaped to account for the desired shape of the monocoque.

Figure 15:
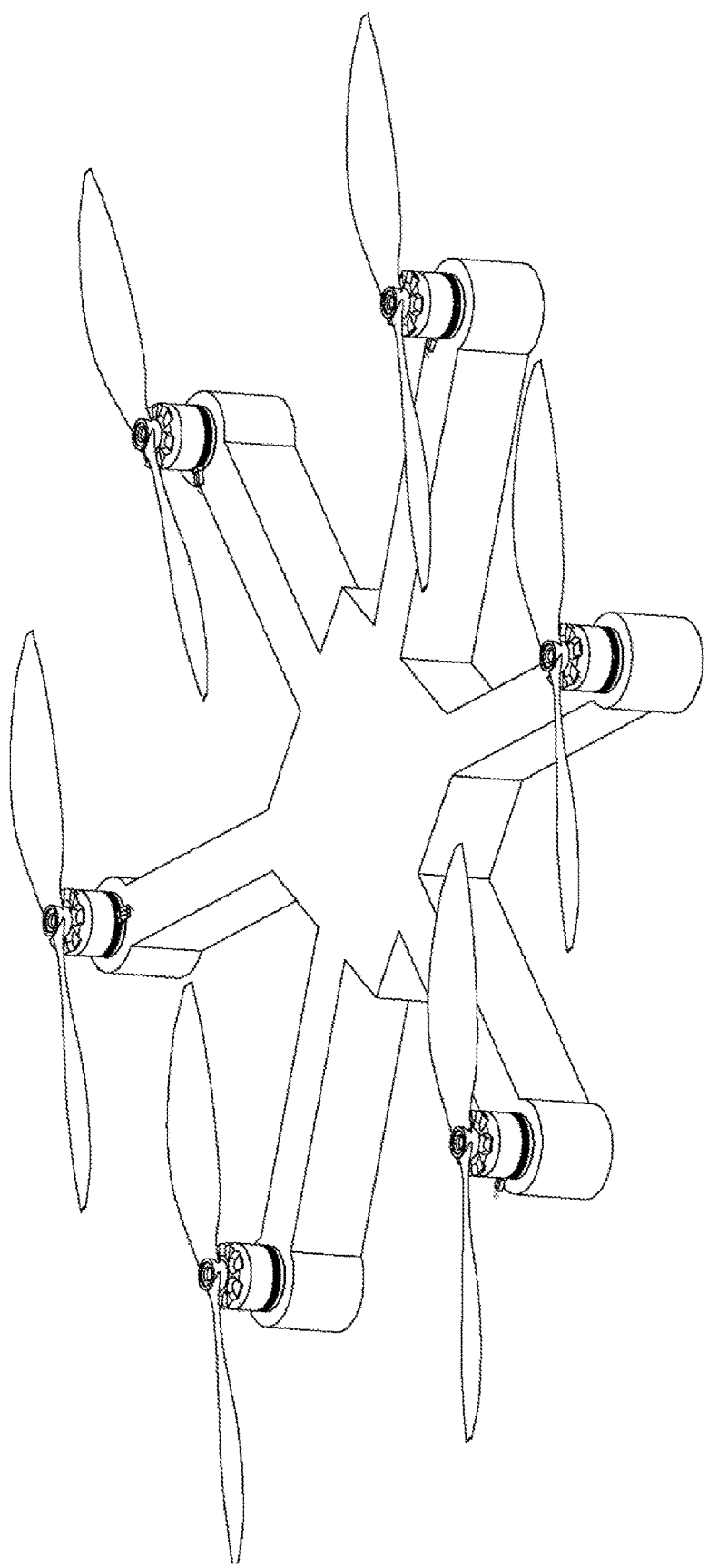
FIG. 15 illustrates an alternative design for an assembled unmanned aerial vehicle featuring six rotors.

FIG. 15 illustrates an alternative design for an assembled unmanned aerial vehicle featuring six rotors, commonly known as a hexrotor. The concept of the monocoque design can be used to manufacture unmanned aerial vehicles with any number of rotors. The number of arm flap wraps equals the number of arms on the unmanned aerial vehicle.

What is claimed is:

1. An unmanned aerial vehicle (UAV) device comprising:
   a monocoque shell with a molded construction that includes a central body and arms that extend outward from the central body, each of the arms includes a terminal end that is spaced away from the central body, the monocoque shell having a cupped shape with a closed top side and sidewalls that extend around an interior space, the monocoque shell including sheets integrated into and extending along the top side and the sidewalls of the central body and integrated into and extending along the top side and sidewalls of each of the arms, the sheets comprising body wraps that are positioned at the central body and arm wraps that are positioned at each of the arms, the sheets being arranged in layers with a body wrap being interposed between each layer of arm wraps and with an overlap between the body wraps and the arms wraps being limited to flaps at ends of the wraps that overlap at an intersection of the arms and the central body, the sheets further configured with fibers of the layers being positioned at n varying orientations to each other;
   a plurality of motors and rotors attached to the top side of the monocoque shell, with one of said plurality of motors and rotors positioned at the terminal end of each of the arms;
   a flight computer positioned in the interior space of the central body; and
   a baseplate that extends across the interior space of the central body and seals the flight computer within the interior space of the central body.

2. The device of claim 1, further comprising a system controller positioned in the interior space of the central body, the system controller operatively connected to each of the motors.

3. The device of claim 2, further comprising an interior plate that extends between the flight computer and the system controller.

4. The device of claim 1, further comprising a battery attached to the baseplate and configured to power the flight computer and the motors, the battery attached to a first side of the baseplate opposite from the flight computer.

5. The device of claim 1, further comprising wires that extend from the flight computer to each of the motors, each of the wires extending from the flight computer along a second side of the central body and one of the arms between the sidewalls and through an opening in the arm to the motor.

* * * * *